United States Patent
Ojala et al.

(10) Patent No.: US 8,570,869 B2
(45) Date of Patent: Oct. 29, 2013

(54) SCALABLE ERROR DETECTION AND CROSS-SESSION TIMING SYNCHRONIZATION FOR PACKET-SWITCHED TRANSMISSION

(75) Inventors: Pasi Ojala, Kirkkonummi (FI); Ari Lakaniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 271 days.

(21) Appl. No.: 12/234,512

(22) Filed: Sep. 19, 2008

(65) Prior Publication Data

US 2009/0154495 A1 Jun. 18, 2009

Related U.S. Application Data

(60) Provisional application No. 60/974,401, filed on Sep. 21, 2007, provisional application No. 60/991,640, filed on Nov. 30, 2007.

(51) Int. Cl.
*H04J 3/14* (2006.01)

(52) U.S. Cl.
USPC ............ 370/235; 370/349; 370/469; 370/509

(58) Field of Classification Search
USPC ............ 370/324, 349, 389, 392, 395.62, 469, 370/471, 503, 507, 509–514; 455/69, 295
See application file for complete search history.

(56) References Cited

U.S. PATENT DOCUMENTS

| | | | |
|---|---|---|---|
| 6,909,753 B2 | 6/2005 | Meehan et al. | |
| 2002/0080886 A1* | 6/2002 | Ptasinski et al. | 375/295 |
| 2005/0097361 A1* | 5/2005 | Apostolopoulos et al. | 713/201 |
| 2006/0010366 A1 | 1/2006 | Hashimoto et al. | |
| 2006/0103660 A1 | 5/2006 | Maynard et al. | |
| 2006/0232447 A1 | 10/2006 | Walker et al. | |
| 2007/0115823 A1* | 5/2007 | Shen | 370/235 |
| 2009/0061785 A1* | 3/2009 | Kawashima et al. | 455/69 |
| 2010/0070762 A1* | 3/2010 | Reeds et al. | 713/161 |

OTHER PUBLICATIONS

International Search Report for PCT Application No. PCT/IB2008/053823 dated Jul. 30, 2009.

* cited by examiner

*Primary Examiner* — Andrew Lai
*Assistant Examiner* — Leon Andrews
(74) *Attorney, Agent, or Firm* — Alston & Bird LLP

(57) ABSTRACT

Systems, methods and computer program codes are provided to facilitate error detection and timing synchronization of scalable data transmissions. To this end, checksum error detection is applied to the core layer and enhancement layers of the scalable payload data in such a way that dropping one or several enhancement layers from the payload data does not change the value of the checksum. Only one checksum is transmitted, e.g., in the payload or in the header of the lower-layer protocol. The transmitter modifies the encoded bit stream in such a manner that the entity in the network deploying the scalable payload and removing layers from the packet does not need to recalculate the checksum placed in the payload or packet header, even when the payload size is changed.

52 Claims, 8 Drawing Sheets

SCALABLE ERROR DETECTION AND CROSS-SESSION TIMING SYNCHRONIZATION FOR PACKET-SWITCHED TRANSMISSION

CROSS-REFERENCE TO RELATED APPLICATIONS

The present application claims priority to U.S. Provisional Patent Application No. 60/974,401, filed Sep. 21, 2007, as well as to U.S. Provisional Patent Application No. 60/991,640, filed Nov. 30, 2007.

FIELD OF THE INVENTION

The present invention relates generally to packet-switched networks. More particularly, the present invention relates to scalable real-time media, media adaptation, the synchronization of Real-time Transport Protocol (RTP) sessions, error resiliency and transmission over packet switched networks, such as in Voice over IP (VoIP) and video conferencing.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Packet switched network transmission protocols typically employed for VoIP comprise the RTP encapsulated in the User Datagram Protocol (UDP), further encapsulated into the Internet Protocol (IP). The checksums employed in the UDP and IP result in discarding all the packets in which the receiver detects bit errors. In other words, the protocol stack in the receiver does not convey any distorted packets to the application layer. Therefore, when IP packets are transmitted over an error prone radio link or over any media introducing transmission errors, the application layer is likely to face packet losses. Conversely, none of the packets reaching the application layer contain any residual bit errors. Due to this phenomenon, an error concealment algorithm is not able to utilize partially correct frames, as can be done, for example, in a circuit switched GSM telephone service. Instead, the erroneous frame needs to be completely replaced. This is likely to make the error concealment process less effective than the approach that is used in circuit-switched services.

Another aspect of packet-switched networks involves media level scalability. This scalability may be deployed in the transmission level, e.g., for controlling the network capacity or shaping a multicast media stream to facilitate operation with participants behind access links of different bandwidths. In the application level, the scalability can be utilized for controlling, e.g., computational complexity, encoding delay, or desired quality level.

The scalable media data comprises a core layer, which is always needed to enable reconstruction in the receiving end, and one or several enhancement layers that can be used to provide added value to the reconstructed media (e.g., improved media quality). It should be noted that, while in some scenarios the scalability can be applied in the transmitting end-point, there are also operating scenarios where it makes more sense to permit an intermediate network element to perform the scaling. The enhancement layers can be transmitted either together with the core layer data or in separate packets. While transmitting the enhancement layers in separate packets from the core layer data makes the scaling operation more straightforward since the scaling operation can be performed by dropping full packets, it provides some challenges, e.g. in the session setup and control procedures. On the other hand, the transmitting of the enhancement layers in the same packet together with the core layer data is more effective in terms of transmission bandwidth usage and also enables a simpler session setup.

Network congestion and limited link bandwidth are examples of reasons that may necessitate the removal of a portion of the scalable content from an IP packet. Furthermore, all receivers may not be capable of receiving or consuming full bit rate content. Hence, a network element controlling the transmission link may remove some of the higher layers of content.

When data from enhancement layers is transmitted in the same packet with core layer data, a scaling operation implies the modification of packet contents. The modification of an IP packet requires always opening and repacketizing the payload. Although the receiver and sender information do not change, the packet size and corresponding header information may be modified. For example, any error detection checksums need to be recalculated when the content of the payload is changed.

Media data that can be divided into two or more classes of importance can benefit from an approach where the error detection is performed separately for different classes of data. In the event that there are errors only in the "less important" parts of the data, many applications are still able to make use of the error-free part of the received data. A scalable media packet carrying the enhancement layers together with the core data clearly forms a similar case by its design; possible errors in the enhancement layers do not affect the core layer, and therefore the core data should be made available for the application also in case some of the enhancement layers are corrupted. A further benefit for the scalable media arises from the fact that separate error detection checksums for each of the layers facilitates simple scaling functionality. Furthermore, different forward error correction (FEC) arrangements can also be used for core and enhancement layers.

Various methods have been introduced to handle packet loss conditions. Some methods, such as partial checksum methods, involving handling only portions of the payload data. In particular, when a UDP-Lite protocol is at issue, a partial checksum could be utilized for unequal error detection. With scalable content, a problem arises involving the need for recalculating a partial checksum when the payload size is modified.

Typically, in circuit switched systems, the most sensitive bits of a speech codec are protected with stronger FEC arrangements compared to the least sensitive bits. A partial error detection code, such as cyclic redundancy check (CRC), can be used to classify the whole frame as lost when the most sensitive bits contain errors. A similar method can be used in packet switched networks.

Unequal FEC protection methods for speech frames are based on the ordering of parameters in descending order of priority. For example, the scalable codec bit stream can be classified to various classes according to the scalability layers and the importance of them. Each priority class can then be protected with an unequal error correction capability. Such an unequal protection arrangement requires two features for receiver implementations that are not typically standardized. First, the protocol stack, and especially the UDP and IP protocol implementations, should be modified to pass partially incorrect packet payloads to protocol stack layers above. Alternatively, protocols allowing erroneous payloads to be passed to the application, such as UDP-Lite, can be used.

An advantage of unequal error detection involves permitting increased capacity, particularly in wireless links when the errors in less sensitive bits do not cause the dropping of the whole packet. The application layer still copes with payloads containing errors in the least sensitive content.

One method for error detection involves having a single checksum covering the entire payload data. This is the approach used, for example, in the UDP protocol. This mode of operation does not enable UED at all and, in the case of scalable content, the removal of one or more enhancement layers from the payload requires re-computation of the checksum. While this is a fully working solution, the computational complexity of the additional CRC computation each time a packet is being scaled may not be a feasible approach in certain scenarios. On the other hand, only one checksum is needed to cover the whole payload in this approach, thereby providing an efficient usage of transmission bandwidth. Additionally, in this arrangement, the end-points only have to compute/verify a single checksum.

An enhancement to the single-checksum approach discussed above is to have a single checksum that covers only selected portions of the payload data, thereby leaving the rest of the payload data uncovered. This approach enables a simple UED, providing a checksum-covered part and uncovered parts of the payload data. Furthermore, a simple two-level scalability can be supported by having the core layer as the checksum-covered part and the enhancement layer as the uncovered part. In this case, achieving scalability by dropping the enhancement layer would not require changing the checksum unless the change of the payload affects the value of the checksum. This kind of functionality is employed, e.g. in UDP-Lite by providing the ability to permit the checksum to cover only the selected part of the data at the beginning of the payload data. Making use of this UED-enabling functionality requires that the payload data must be arranged in a suitable way (i.e., the most important data should appear at the beginning of the payload) and the application can benefit by letting the errors in uncovered part go unnoticed. An example of such a payload is the RTP payload for the AMR and AMR-WB speech codecs, which provides an option for including a CRC bit field in the payload header. The CRC check is performed over the most sensitive speech bits, namely the class A bits. In this scenario, the goal is to discard the frame only if there are bit errors in the most sensitive bits. On the other hand, errors in the remaining portion of the frame can be tolerated. Currently, unequal error detection can be utilized in full only with the UDP-Lite and DCCP protocols. These protocols enable the utilization of functionality, which allows for the passing of partially corrupted packets up to the application layer.

In a variation of the above method, the UDP-Lite checksum, for example, can be used to cover part of the payload, with a separate payload-internal checksum being used to cover the parts of the payload not covered by the UDP-Lite checksum. This approach provides full checksum coverage for the payload, which enables also discarding the less important portion of the payload data in case errors are detected. This can be particularly useful in some applications that cannot tolerate any (undetected) errors.

A further option for a more flexible payload design involves dividing the data into several subsections and to have separate checksums for each subsection. This system enables both flexible UED and flexible scalability. When each of the layers is covered by a separate checksum, the dropping of any of the layers (either due to a detected error or due to a scaling operation) can be performed without the need to re-compute the checksum(s). However, a drawback to this system is that the use of several checksums requires sending more data compared to previous approaches with only a single checksum. Furthermore, in this arrangement, several checksums need to be separately computed at the sender and verified at the receiving end. On the other hand, this approach enables an increased robustness to errors and flexible scalability, without the need to re-compute checksum(s) in an intermediate element that performs the scaling.

IP transport mechanisms provide tools for FEC packets. For example, the Internet Engineering Task Force (IETF) Request for Comments (RFC) 2733, which can be found at www.ietf.org/rfc/rfc2733.txt, provides a generic mechanism for transporting XOR-based forward error correction data within a separate RTP session. The payload header of FEC packets contains a bit mask identifying the packet payloads over which the bit-wise XOR operation is calculated and a few fields for RTP header recovery of the protected packets. One XOR FEC packet enables recovery of one lost source packet.

Work is being conducted to replace TETF RFC 2733 with similar RTP payload format for XOR-based FEC protection also including the capability of uneven levels of protection, herein referred to as the ULP Internet Draft (A. H. Li, "RTP payload format for generic forward error correction," Internet Engineering Task Force Internet Draft draft-ietf-avt-ulp-23.txt, August 2007). The payloads of the protected source packets are split into consecutive byte ranges, starting from the beginning of the payload. The first byte range, starting from the beginning of the packet, corresponds to the strongest level of protection, and the protection level decreases as a function of byte range order. Hence, the media data in the protected packets can be organized in such a way that the data appears in descending order of importance within the payload and a similar number of bytes correspond to similar subjective impact in quality among the protected packets. The number of protected levels in FEC repair packets is selectable, and an uneven level of protection is obtained when the number of levels protecting a set of source packets is varied. For example, if there are three levels of protection, one FEC packet may protect all three levels, a second packet may protect the two first levels, and a third packet may protect only the first level. When applied to RTP payloads containing AMR-WB coded data, the ULP Internet Draft can be used to protect class A bits more robustly compared to class B bits. Details concerning unequal error protection and bit classification of AMR and AMR-WB frames can be found in section 3.6 of IETF RFC 4867, which can be found at www.ietf.org/rfc/rfc4867.txt, and the Third Generation Partnership Project (3GPP) specification 3GPP TS 26.201.

Another emerging trend in the field of media coding involves what are referred to as "layered codecs." Such layered codecs include, for example, the International Telecommunications Union (ITU) Telecommunication Standardization Sector (ITU-T), Embedded Variable Bit-Rate (EV-VBR) speech/audio codec and the ITU-T Scalable Video Codec (SVC). The scalable media data comprises a core layer, which is always needed to enable reconstruction at the receiving end, and one or more enhancement layers that can be used to provide added value to the reconstructed media (e.g., to provide improved media quality or an increased level of robustness against transmission errors, etc). The scalability can be deployed at the transmission level, e.g., for controlling the network capacity or shaping a multicast media stream in order to facilitate operation with participants behind access links of different bandwidth. At the application level, the scalability can be utilized for controlling, e.g., computational complexity, encoding delay, or desired quality level. It should be noted that, while in some scenarios the scalability can be applied at the transmitting end-point, there are also operating scenarios where it makes more sense to permit an intermediate network element to perform the scaling.

From a media transport point of view, scalable codecs provide two basic options—the enhancement layers can be transmitted either together in the same packets with the core layer data, or the (subsets of) enhancement layers can be transmitted in separate packet stream(s). The transmission in separate packet streams also requires a signalling mechanism that can be used to bind together the packet data streams carrying layers of the same media source.

The approach of carrying all layers (of a media frame) in a single packet provides for a low overhead and easy cross-layer synchronization. On the other hand, this approach results in more complex scaling in an intermediate network element; the scaling possibility requires the network element to be aware of the details of the packet structure. Furthermore, the scaling also implies modification of packets.

The approach employing separate data streams for (subsets of) layers provides for a simple scaling possibility because the scaling can be realized by discarding all packets of some data streams. This does not require in-depth knowledge about the packet structure, as long as the (signalling) information on the relationships between the data streams is available. However, this approach results in increased overhead, since each data stream introduces its own protocol overhead (e.g. IP/UDP/RTP). A further challenge associated with this approach involves cross-layer synchronization, i.e., how the receiver can reconstruct the media frames based on layers it receives distributed across multiple data streams. It should be noted that employing multiple data streams, e.g., multiple RTP sessions, is the traditional method for transmitting layered media data within the RTP framework (often referred to as scalable multicast).

The timeline of a media stream received in RTP packets can be reconstructed based time stamp (TS) information included in the RTP header. The RTP TS provides information on the temporal difference compared to the other RTP packets transmitted in the same RTP session, which enables the placement of each received media frame in its correct place in the timeline. However, the initial value of the RTP TS of an RTP session is random, which implies that RTP TS does not indicate an absolute time. Instead, the RTP TS only references a timing reference within the RTP session. It should be noted that this "randomness" can be considered to be an unknown offset from the absolute time, which is different in each RTP session. Therefore two or more RTP sessions cannot be synchronized based soley on their RTP TS values. This is also true for separate RTP sessions used to carry (subsets of) layers of layered encoding.

A conventional mechanism within RTP for synchronizing multiple RTP sessions is based on RTCP reports transmitted within each session. In this approach, the sender includes both the timing reference (NTP) and the sending instant in the RTP TS domain in the RTCP Sender Reports (SR) that it transmits according to specified rules. This enables the receiver to compute the RTP TS offset from the timing reference (NTP) for each of the RTP sessions it receives. These offset values can then be used to match the timing of the media data received in separate RTP sessions, for example to combine layers of a media frame received in multiple RTP sessions. However, this approach requires the first RTCP SRs for each of the RTP sessions to be available before the full reconstruction of a media frame is possible. In practice, this implies that only the core layer of the layered encoding is available until the synchronization information is available.

One alternative to the above involves pre-synchronizing the RTP TS spaces across RTP sessions in the transmitting end-point. In this approach, the "random" initial value of the RTP TS would be the same for each of the RTP sessions. While this may provide a simple cross-session synchronization mechanism without having to transmit additional data, it is not fully in line with the RTP specification, and existing RTP implementations may not support it. Furthermore, such a mechanism would provide the (pre-)synchronization at the RTP (header) level, but it would be available only for subset of RTP payloads. Such payload type-dependent processing at RTP level is not a desirable feature in a system handling multiple payload types.

Still another approach for synchronizing multiple RTP sessions involves attaching additional information for each transmitted layer, indicating its temporal location in the presentation timeline. Such information may comprise, for example, a cross-layer sequence number or additional timestamp information that can be used to reconstruct the presentation order of media frames and layers within the frames. However, this approach would still introduce additional overhead for each transmitted layer. This is important because, particularly in the case of smaller pieces of speech/audio data, e.g., in the order of 10-20 bytes, even one additional byte of overhead may have a significant effect on the overall system performance.

SUMMARY OF THE INVENTION

Various embodiments of the present invention provide systems and methods for providing improved scalable error detection for packet-switched transmission. In one embodiment, common CRC error detection is applied for the core layer and for enhancement layers of the scalable payload in such a way that dropping one or several enhancement layers from the payload does not change the value of the CRC checksum. Only one CRC checksum is transmitted, e.g., in the payload header or in the header of the lower-layer protocol. The transmitter modifies the encoded bit stream in such a manner that the entity in the network deploying the scalable payload and removing layers from the packet does not need to recalculate the CRC placed in the payload or packet header, even when the payload size is changed. A prefix/tail bit field is added in the beginning/end of each enhancement layer to make the CRC check match with the common CRC checksum.

In another embodiment, the receiver may check the correctness of each received layer simultaneously and, if desired, utilize data only from correctly received layers. Furthermore, the receiver does not need to know the original packet structure, i.e., the number of enhancement layers. The common CRC checksum has the same value for each layer, regardless of the number of transmitted and received enhancement layers.

Various embodiments also provide for an improved system and method for scalable cross-session timing synchronization. This system and method involves the application of a common CRC checksum for the core layer and the enhancement layers of the scalable media frame in a scenario where the core layer and enhancement layers are transmitted in separate RTP sessions. The transmitted data is formulated in such a way that the CRC checksum computed over an enhancement layer corresponding to a certain core layer is modified to have the same value as the CRC checksum included in the packet carrying the data for the corresponding core layer. The receiver can associate an enhancement layer to the particular core layer by computing the CRC checksum over the enhancement layer and finding a received core layer with the matching CRC checksum. Once a matching pair of core and enhancement layers is found, the synchronization between RTP sessions carrying the core layer and this particular enhancement layer is established.

Various embodiments of the present invention can be applied to emerging scalable speech, audio coders and video coders under ITU-T, for example, EV-VBR and SVC.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
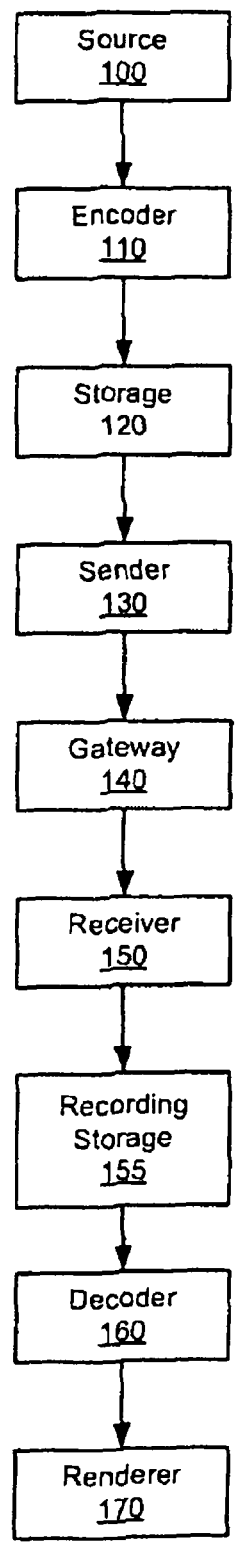
FIG. 1 is an overview diagram of a system within which various embodiments of the present invention may be implemented.

FIG. 1 is a graphical representation of a generic multimedia communication system within which various embodiments of the present invention may be implemented. As shown in FIG. 1, a data source 100 provides a source signal in an analog, uncompressed digital, or compressed digital format, or any combination of these formats. An encoder 110 encodes the source signal into a coded media bitstream. It should be noted that a bitstream to be decoded can be received directly or indirectly from a remote device located within virtually any type of network. Additionally, the bitstream can be received from local hardware or software. The encoder 110 may be capable of encoding more than one media type, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 1 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include, but is not limited to, RTP, UDP and IP, although it is also noted that 3GPP circuit-switched telephony may also be used in the context of various embodiments of the present invention. When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data streams according to the downlink and/or receiver capabilities, such as controlling the bit rate of the forwarded stream according to prevailing downlink network conditions. Examples of gateways 140 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 may be called an RTP mixer or an RTP translator, i.e., an "intermediate node" of an end-to-end RTP session. Alternatively, the gateway 140 may act as an endpoint of an RTP session.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. If there are many coded media bitstreams associated with each other, a container file is typically used and the receiver 150 comprises or is attached to a container file generator producing a container file from input streams. Some systems operate "live," i.e., omit the recording storage 155 and transfer coded media bitstream from the receiver 150 directly to the decoder 160. In some systems, only the most recent part of the recorded stream, e.g., the most recent 10-minute excerption of the recorded stream, is maintained in the recording storage 155, while any earlier recorded data is discarded from the recording storage 155.

The coded media bitstream is transferred from the recording storage 155 to the decoder 160. If there are many coded media bitstreams associated with each other and encapsulated into a container file, a file parser (not shown in the figure) is used to decapsulate each coded media bitstream from the container file. The recording storage 155 or a decoder 160 may comprise the file parser, or the file parser is attached to either recording storage 155 or the decoder 160.

The coded media bitstream is typically processed further by a decoder 160, whose output is one or more uncompressed media streams. Finally, a renderer 170 may reproduce the uncompressed media streams with a loudspeaker, for example. The receiver 150, recording storage 155, decoder 160, and renderer 170 may reside in the same physical device or they may be included in separate devices.

Various embodiments of the present invention provide systems and methods for providing improved scalable error detection for packet-switched transmission. In one embodiment, common CRC error detection is applied for the core layer and for enhancement layers of the scalable payload in such a way that dropping one or several enhancement layers from the payload does not change the value of the CRC checksum. Only one CRC checksum is transmitted, e.g., in the payload header or in the header of the lower-layer protocol. The transmitter modifies the encoded bit stream in such a manner that the entity in the network deploying the scalable payload and removing layers from the packet does not need to recalculate the CRC placed in the payload or packet header, even when the payload size is changed. A prefix/tail bit field is added in the beginning/end of each enhancement layer to make the CRC check match with the common CRC checksum.

In another embodiment, the receiver may check the correctness of each received layer simultaneously and, if desired, utilize data only from correctly received layers. Furthermore, the receiver does not need to know the original packet structure, i.e., the number of transmitted enhancement layers. The common CRC checksum has the same value for each layer, regardless of the number of transmitted and received enhancement layers.

In various embodiments of the present invention, having a common CRC check polynomial for core and each enhancement layer, a network element or another entity may remove enhancement layer(s) from the payload without touching the CRC and hence without a need to recalculate the CRC covering the payload. Furthermore, the receiver does not need to know whether the payload was touched between the transmitter and receiver. The CRC verification will match, regardless of how many enhancement layers are received. The common CRC is especially advantageous for scalable content, when the CRC is located in the (lower-layer) packet header, and the CRC check is conducted over the whole payload.

According to various embodiments, having a separate CRC check for each enhancement layer is not necessary. In such a case, no separate error check for each layer is conducted. However, when separate error checks can be conducted, the receiver may reconstruct the frame using only the correctly received core layer and enhancement layers. Furthermore, unequal error protection can be used for the core layer and enhancement layers. For example, when the core bitstream is received error free, the remaining part of the bit stream having less or no protection at all can be applied to enhance the decoding and to reconstruct the higher bit rate mode. When the common CRC is placed in the lower-layer protocol header, a network element may remove some of the enhancement layers from the payload without a need for recalculating the checksum information in the header. This can be particularly useful because, while some applications/codecs can use enhancement layer data that may or may not contain errors, others are not capable of doing so.

In more conventional systems, the media payload header contains the checksum calculated over the whole payload (equal error detection) for regular UDP transport, or partially over the most sensitive part of the payload (unequal error detection) for e.g., UDP-Lite transport. Furthermore, the Datagram Congestion Control Protocol (DCCP), which is discussed at www.ietf.org/rfc/rfc4340.txt, could be used to carry the CRC checksum as an (optional) part of the protocol header.

The CRC checksum is the most common error detection method. The checksum is generated by basically dividing the message polynomial with a selected and well known key polynomial. The remainder of the polynomial division operation is the actual CRC checksum information that will be transmitted.

$$M(z)=Q(z)K(z)+R(z)$$

In the above, M(z) is the actual message in the payload, K(z) is the key polynomial (divisor), Q(z) is the quotient and R(z) is the remainder, which is also the CRC checksum transmitted to the receiver as part of the packet (either in the payload or in the packet header). When the length of the key polynomial K(z) is N+1, then the length of the remainder (CRC checksum) is N. The following shows a simple CRC calculation:

$$M(z)=[1\ 1\ 0\ 1\ 1\ 0\ 1](=z^6+z^5+z^3+z^2+z^0),\ K(z)=[1\ 0\ 1\ 1](=z^3+z^1+z^0)$$

```
                    1  1  1  1
        1 0 1 1 | 1  1  0  1  1  0  1
                  1  0  1  1
                  ─────────
                     1  1  0  1
                     1  0  1  1
                     ─────────
                        1  1  0  0
                        1  0  1  1
                        ─────────
                           1  1  1  1
                           1  0  1  1
                           ─────────
                              1  0  0
```

In the above, the remainder (CRC polynomial) of the calculation is R(z)=[1 0 0].

Alternatively, the CRC check can be conducted by appending the message polynomial with zeros prior to CRC computation. In other words, a zero vector of the length of the CRC polynomial is appended to the end of the message. The message bits are effectively shifted left by N places, and N zeros are inserted in the least significant bits of the message, i.e., M(z) is multiplied by $z^N$, and the outcome is a follows:

$$M(z)z^N = Q(z)K(z) + R(z)$$

The following shows a simple CRC calculation illustrating the effect of appending a zero vector to the end of the message:

$$M(z) = [1\ 1\ 1\ 0\ 1\ 1\ 0\ 1]\ (=z^6+z^5+z^3+z^2+z^0),\ K(z) = [1\ 0\ 1\ 1]\ (=z^3+z^1+z^0).$$

The message polynomial M(z) is then multipled with $z^3$ to determine the reminder. Hence, M(z) $z^3$=[1 1 0 1 1 0 1 0 0 0]

```
                 1 1 1 1 1 0 1
    1 0 1 1 ) 1 1 0 1 1 0 1 0 0 0
              1 0 1 1
              ‾‾‾‾‾‾‾
                1 1 0 1
                1 0 1 1
                ‾‾‾‾‾‾‾
                  1 1 0 0
                  1 0 1 1
                  ‾‾‾‾‾‾‾
                    1 1 1 1
                    1 0 1 1
                    ‾‾‾‾‾‾‾
                      1 0 0 0
                      1 0 1 1
                      ‾‾‾‾‾‾‾
                        0 1 1 0
                        0 0 0 0
                        ‾‾‾‾‾‾‾
                          1 1 0 0
                          1 0 1 1
                          ‾‾‾‾‾‾‾
                            1 1 1
```

In the above, the remainder (CRC polynomial) of the calculation is R(z)=[1 1 1].

If the remainder polynomial is appended to both sides of the equation $M(z)z^N=Q(z)K(z)+R(z)$, the outcome is that the remainder polynomial of length N is appended at the end of the message polynomial, and the remainder of the division operation by the key polynomial disappears:

$$M(z)z^N + R(z) = Q(z)K(z)$$

An example showing the remainder R(z) appearing as zero when the CRC checksum polynomial is appended at the end of the message polynomial is as follows:

$$M(z) = [1\ 1\ 0\ 1\ 1\ 0\ 1],\ K(z)[1\ 0\ 1\ 1],\ R(z)[1\ 1\ 1]$$

```
                 1 1 1 1 1 0 1
    1 0 1 1 ) 1 1 0 1 1 0 1 1 1 1
              1 0 1 1
              ‾‾‾‾‾‾‾
                1 1 0 1
                1 0 1 1
                ‾‾‾‾‾‾‾
                  1 1 0 0
                  1 0 1 1
                  ‾‾‾‾‾‾‾
                    1 1 1 1
                    1 0 1 1
                    ‾‾‾‾‾‾‾
                      1 0 0 1
                      1 0 1 1
                      ‾‾‾‾‾‾‾
                        0 1 0 1
                        0 0 0 0
                        ‾‾‾‾‾‾‾
                          1 0 1 1
                          1 0 1 1
                          ‾‾‾‾‾‾‾
                            0 0 0
```

This result is applied later when designing a common CRC polynomial for a scalable bit stream. The advantage of the result is that the receiver, in order to conduct the CRC check, does not need to compare the outcome of the polynomial division with the transmitted CRC bits, but the error check is completed and error free transmission is verified or determined when the remainder is zero.

According to various embodiments, a scalable bitstream is accompanied by a common CRC field. The payload header or the lower-level protocol header contains the CRC field, against which the correctness of the received payload is checked. The same CRC field is utilized for the core layer as well as to all enhancement layers.

In general, the CRC check for the core layer bit stream $M_{core}(z)$ is as follows:

$$M_{core}(z) = Q_{core}(z)K(z) + R_{ref}(z)$$

The remainder polynomial $R_{ref}(z)$ computed for the core layer is used as the CRC check for the enhancement layers as well. When dividing the message polynomial containing both the core and the enhancement layer(s), the remainder is different. It should be noted that the core layer and the enhancement layers can be handled together as a single bitstream, or they can be handled separately. Therefore, prefix/tail bits need to be inserted in the beginning/end of each enhancement layer.

When the remainder (CRC check bits) computed for the core layer bit stream is $R_{ref}(z)$, any arbitrary bit stream can be tailored to produce the same remainder. The method involves adding the remainder polynomial of the core layer bit stream as the prefix/tail bits to the message polynomial, i.e., (bit-wise) adding $R_{ref}(z)$ to the R(z) appended to the end of the message polynomial. The outcome is the desired remainder as follows:

$$M(z)z^N + R(z) + R_{ref}(z) = Q(z)K(z) + R_{ref}(z)$$

Instead of having a zero remainder, the CRC check of the message $M(z)z^N+R(z)+R_{ref}(z)$ will produce the desired output remainder polynomial $R_{ref}(z)$. It should also be noted that the message length is not increased when the desired remainder polynomial is added at the end of the message since the length of the prefix/tail bit field $R(z)+R_{ref}(Z)$ is the same N.

The following example shows the desired remainder appearing as the outcome of the division operation when it is first added to the CRC polynomial at the end of the message: M(z)=[1 1 0 1 1 0 1], K(z)=[1 0 1 1], R(z)=[1 1 1], desired remainder for example $R_{ref}(z)$=[1 0 0], R(z)+$R_{ref}(z)$=[0 1 1]

```
                 1 1 1 1 1 0 1
    1 0 1 1 ) 1 1 0 1 1 0 1 0 1 1
              1 0 1 1
              ‾‾‾‾‾‾‾
                1 1 0 1
                1 0 1 1
                ‾‾‾‾‾‾‾
                  1 1 0 0
                  1 0 1 1
                  ‾‾‾‾‾‾‾
                    1 1 1 1
                    1 0 1 1
                    ‾‾‾‾‾‾‾
                      1 0 0 0
                      1 0 1 1
                      ‾‾‾‾‾‾‾
                        0 1 1 1
                        0 0 0 0
                        ‾‾‾‾‾‾‾
                          1 1 1 1
                          1 0 1 1
                          ‾‾‾‾‾‾‾
                            1 0 0
```

As indicated above, the desired remainder $R_{ref}(z)$=[1 0 0] appears in the calculation.

It is helpful to consider a case where the payload comprises a core bit stream and m enhancement layers. The length of the core is $N_0$ bits and the length of the enhancement layer i is $N_i$ bits. Thus, the message polynomial is as follows:

$$M_{payload}(z) = M_m(z)z^{N_0+N_1+\ldots+N_{m-1}} + M_{m-1}(z)z^{N_0+N_1+0} \ldots + N^{m-2} + \ldots + M_1(z)z^{N_0} + M_{core}(z)$$

Instead of the dedicated remainder $R_i(z)$ of each enhancement layer, the prefix/tail bits comprising the polynomial $R_i(z)+R_{ref}(z)$ are added in the beginning/end of each enhancement layer $M_i(z)$. The result is that a common CRC polynomial $R_{ref}(z)$ can be utilized for checking the correctness of the core and each enhancement layer separately. A CRC check (in the receiver) over the core layer and any of the enhancement layers produces an identical result. In other words, the remainder of the division operation can always be compared against the CRC bit field, which can be located in the payload, in the payload header or in the packet header in various embodiments.

Figure 2A:
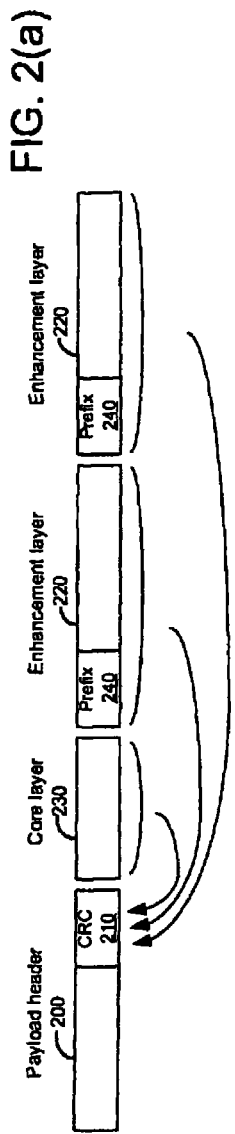
FIGS. 2(a) and 2(b) show payload structures with common CRC bit field (polynomial $R_{ref}(z)$) in the payload header and prefix bits (polynomial $R_i(z)+R_{ref}(z)$) in the beginning of each scalable layer.
Figure 2B:
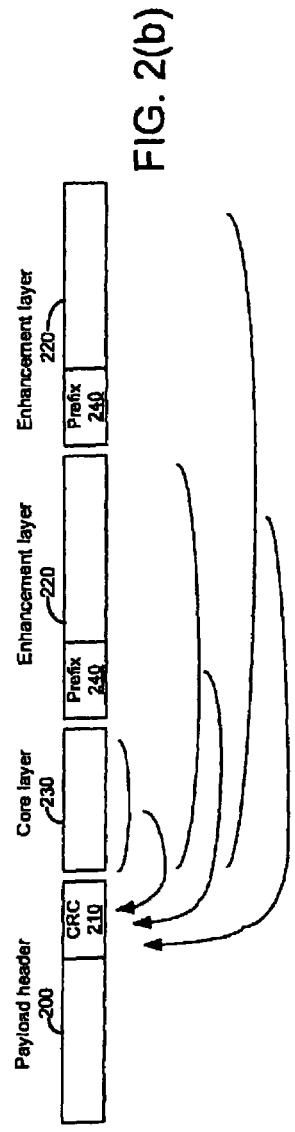

FIGS. 2(a) and 2(b) show a payload structure with common CRC bit field 210 (polynomial $R_{ref}(z)$) in a payload header 200 and prefix bits 240 (polynomial $R_i(z)+R_{ref}(Z)$) in the beginning of each scalable layer 220. A core layer 230 is also shown A CRC check of each enhancement layer 220, either separately (as shown in FIG. 2(a)) or together with all lower layers (as shown in FIG. 2(b)), will produce the common remainder stored in the payload (or packet) header 200. Additionally, the CRC field 210 could be carried somewhere else in the payload, in the packet header or the header of a lower-level protocol instead of in the payload header. Still further, the CRC check can be conducted as a combination or hybrid of the systems depicted in FIGS. 2(a) and 2(b). For example, up to a certain point, the CRC check can be performed for each respective layer together with all lower layers. After this point, however, a separate check can be performed on each layer individually (without considering lower layers). Other variations of such a hybrid system are also possible.

Figure 3:
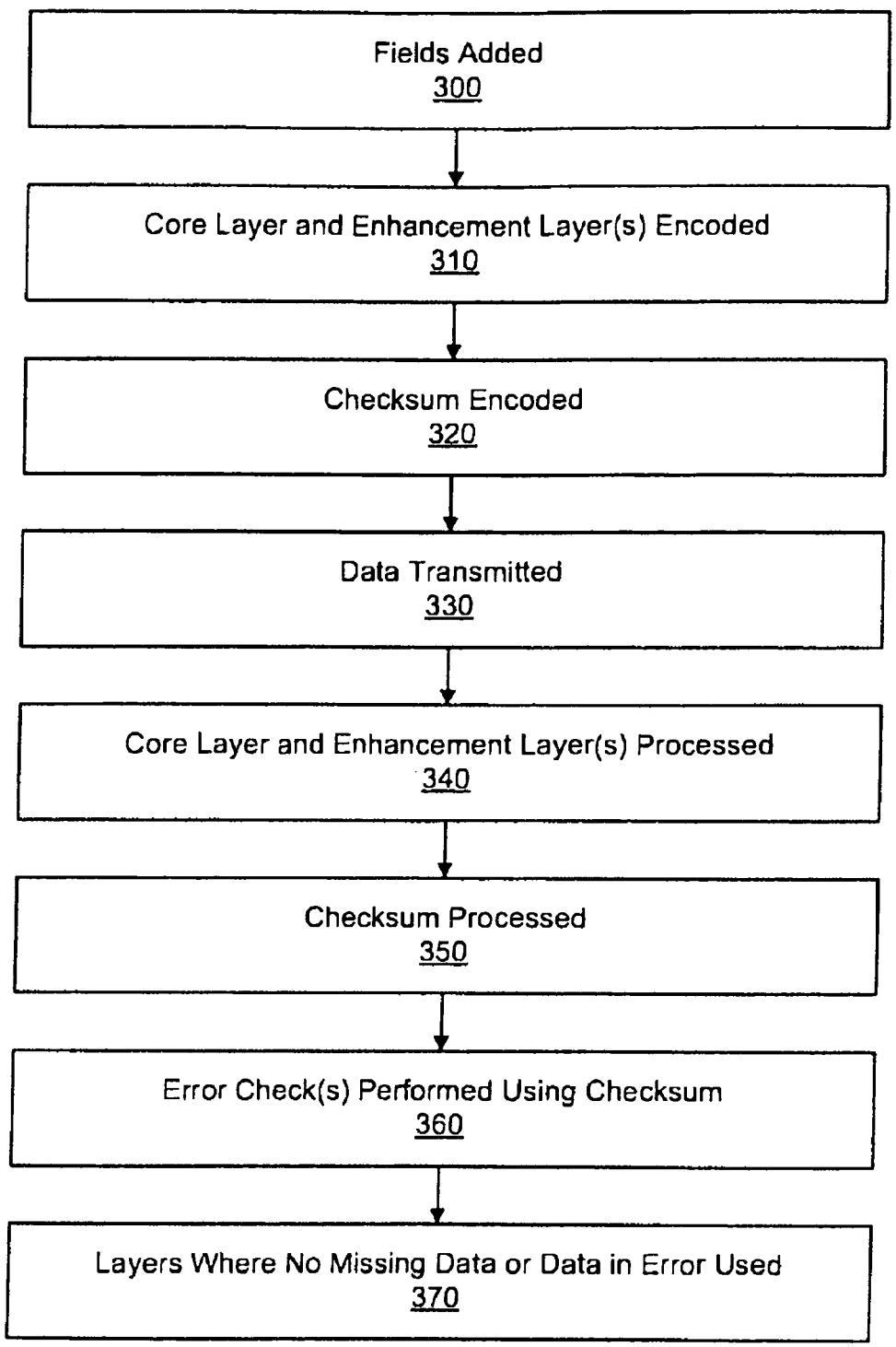
FIG. 3 is a flow chart showing a process by which various embodiments of the present invention may be implemented.

FIG. 3 is a flow chart showing a process by which various embodiments of the present invention may be implemented. At 310 in FIG. 3, a plurality of layers are encoded, i.e., formed into a packet, including a core layer and at least one enhancement layer. At 320, a single checksum is encoded. It should be noted that, although 310 and 320 are shown as occurring sequentially, these processes can occur simultaneously and/or as a single process. As discussed previously, the single checksum is applicable for use in performing error checks of the core layer and each enhancement layer. In the case of the enhancement layers, the single checksum is applicable in error checks for each enhancement layer either individually or in combination with each lower enhancement layer and the core layer. As discussed previously, this may be accomplished when necessary by adding an additional field to each enhancement layer such that the single checksum will be matched during any subsequent error check where no errors or missing data are present. The adding of these fields is represented at 300. At 330, the encoded data is transmitted from a sending apparatus to a receiving apparatus.

At 340, the core layer and any enhancement layers are processed from the bitstream by the receiver, and the single checksum is processed at 350. Again, although these processes are shown as occurring sequentially, these processes can occur simultaneously and/or as a single process. At 360, at least one error check is performed for one or more of the layers using the single checksum. Regardless of which layer(s) are being checked, the single checksum is usable for the error check. As discussed previously, it is possible for each enhancement layer to be separately checked for errors, or each enhancement layer can be checked in combination with each lower enhancement layer and the core layer. At 370 and in one embodiment, only those layers where no data was missing or in error is used for the further processing.

Various embodiments also provide for an improved system and method for scalable cross-session timing synchronization. This system and method involves the application of a common CRC checksum for the core layer and the enhancement layers of the scalable media frame in a scenario where the core layer and enhancement layers are transmitted in separate RTP sessions. The transmitted data is formulated in such a way that the CRC checksum computed over an enhancement layer corresponding to a certain core layer is modified to have the same value as the CRC checksum included in the packet carrying the data for the corresponding core layer. The receiver can associate an enhancement layer to the particular core layer by computing the CRC checksum over the enhancement layer and finding a received core layer with the matching CRC checksum. Once a matching pair of core and enhancement layers is found, the synchronization between RTP sessions carrying the core layer and this particular enhancement layer is established.

Figure 4:
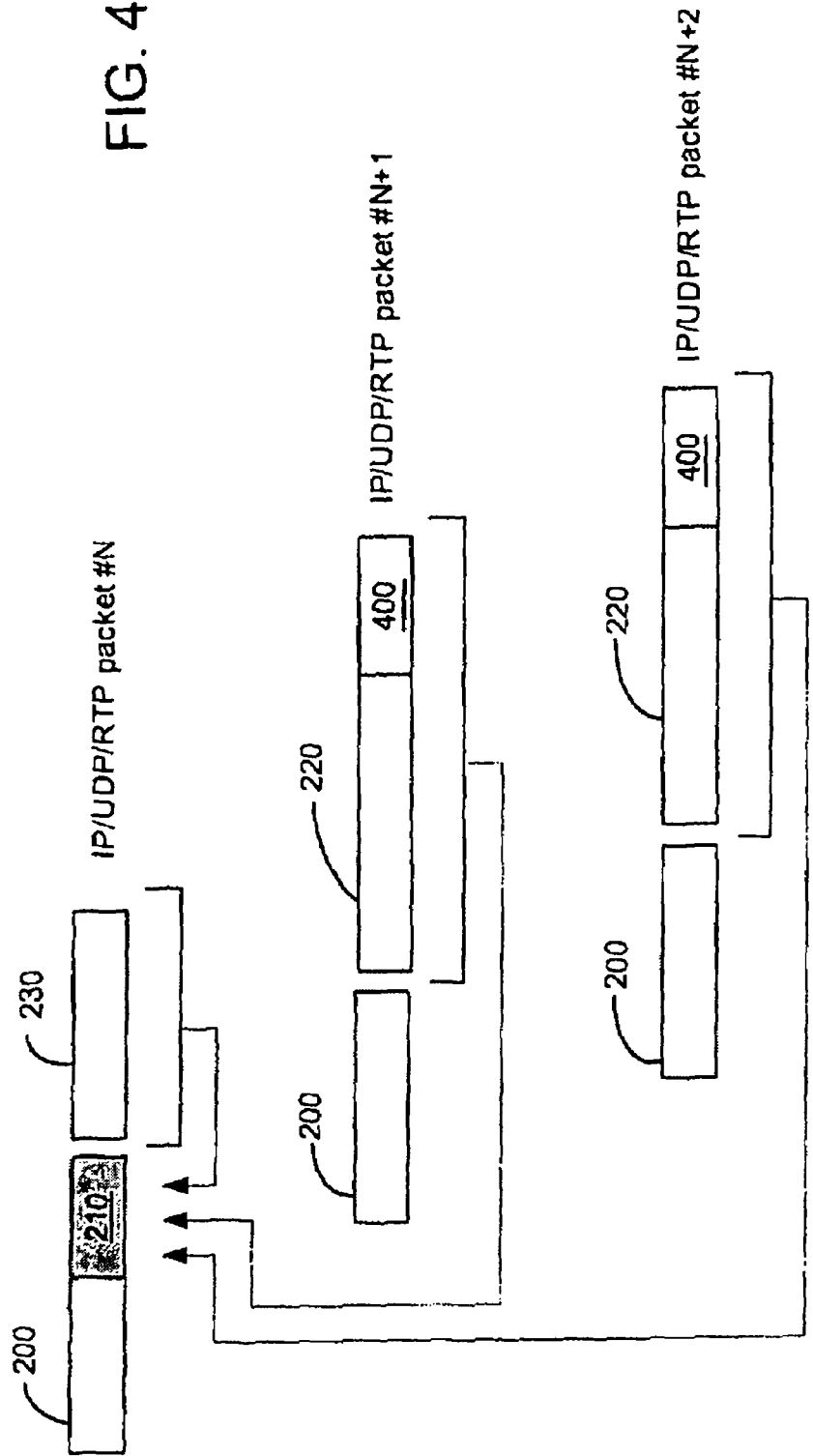
FIG. 4 is a representation of a payload structure with a common CRC bitfield (polynomial $R_{ref}(z)$) in the core layer packet payload header and tail bits (polynomial $R_i(z)+R_{ref}(z)$) in the end of each scalable layer.

FIG. 4 presents a typical transmission system for scalable media content, with a common CRC bit field 210 (polynomial $R_{ref}(z)$) in the core layer packet payload header 200 and tail bits 400 (polynomial $R_i(z)+R_{ref}(z)$) in the end of each scalable layer 220. The core layer 230 and each enhancement layer 220 are conveyed in separate RTP packets in separate RTP sessions. The encoder/transmitter determines a tail bit field 400 for each enhancement layer 220. The tail bits 400, as well as the corresponding core layer CRC checksum 210, are attached to either an RTP payload, a payload header or a packet header. Alternatively, the CRC checksum 210 can be attached to any of the enhancement layer packets. A CRC check of each layer separately will produce an identical checksum with the one transmitted in the payload, payload header or packet header of the core layer.

Figure 5:
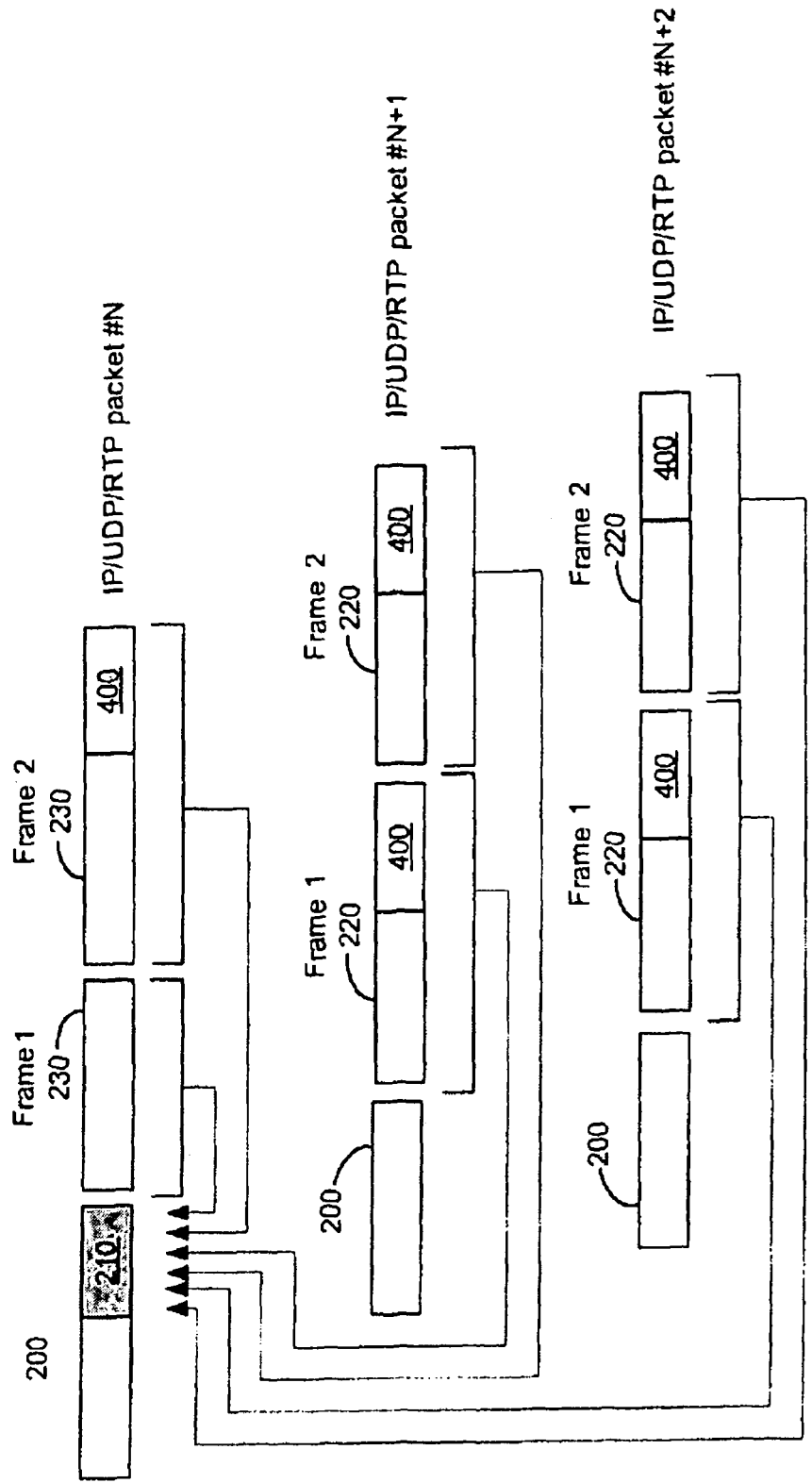
FIG. 5 is a representation of a payload structure when two frames are encapsulated in the same RTP packet.

FIG. 5 presents an alternative transmission mechanism for scalable media content transmitting more than one frame in an RTP packet. In this arrangement, the core layer 230 and each enhancement layer 220 are conveyed in separate RTP packets, i.e., in separate RTP sessions. A common CRC bit field 210 (polynomial $R_{ref}(z)$) is placed in the core layer packet payload header, and tail bits 400 (polynomial $R_i(z)+R_{ref}(z)$) are placed in the end of the core layer 230 of the second frame and in each scalable layer. The encoder/transmitter determines a tail bit field 400 as described above. The tail bits 400, as well as the corresponding core layer CRC checksum 210, are attached to an RTP payload, a payload header or a packet header. Alternatively, the CRC checksum 210 can be attached to any of the enhancement layer packets. Once again, a CRC check of each layer separately will produce an identical checksum with the one transmitted in the payload, payload header or packet header of the core layer 230.

It should be noted that the CRC checksum of the second frame of a payload/packet is not critical for synchronization purposes in various embodiments. When the synchronization of the core layer and enhancement layers of the first frame of the payload/packet is achieved, the second frame is automatically in synchronization. Instead, the CRC checksum can be utilized for scalable unequal error detection only, as described previously.

In an alternative to the above, the tail bits can be attached in the encoder/transmitter in such a manner that the checksum is always combined with the previous enhancement layer and core layer. In other words, the checksum of the core layer+enhancement layer #1 needs to match with the core layer CRC. Furthermore, the checksum of the core layer+enhancement layer #1+enhancement layer #2+ . . . +enhancement layer #N needs to match with the core layer CRC. This embodiment prevents the usage of higher layer enhancement layers when an intermediate enhancement layer is missing. This can be particularly advantageous in the event of an incremental architecture in which additional enhancement layers always utilize the information of all lower layers.

The receiver synchronizes the core layer with the corresponding enhancement layers by comparing the CRC checksum computed at the receiver at each layer (received in separate RTP sessions) with the received CRC checksum for the core layer. If the checksum does not match, then the enhancement layer RTP session is either corrupted or it is supposed to be attached to another core layer RTP session. If the checksum does match, then the enhancement layer belongs to the same media frame with the core layer, and the RTP TS offset between the RTP session for the core layer and the RTP session for the enhancement layer at issue can be computed. This provides the necessary information for cross-layer synchronization between these layers. It should be noted that re-synchronization is needed only in the event that a discontinuity is introduced for the timestamp space in either of the RTP sessions. Thus, it is sufficient to perform the cross-layer synchronization, for example, in a few frames in the beginning of the session or (in a few frames) at regular intervals.

It should also be noted that when the common CRC is placed in the lower-layer protocol header, a network element may remove some of the enhancement layers from the payload without having to recalculate the checksum information in the header.

By having a common CRC check polynomial for the core layer and each enhancement layer, the synchronization between the core layer and all of the enhancement layers is maintained without having to transmit additional synchronization data. The dedicated bit patterns of the CRC checksum in the core layer (or one of the enhancement layers) and the required tail bits ensure that wrong combinations of core and enhancement layers are not created. Additionally, this arrangement does not suffer from any IP/UDP protocol limitations, as the synchronization is done in the application layer. Still further, it is possible to reuse the existing CRC checksum based error detection mechanism for the scalable media formats, particularly when more than one frame is encapsulated in the same RTP packet.

Figure 6:
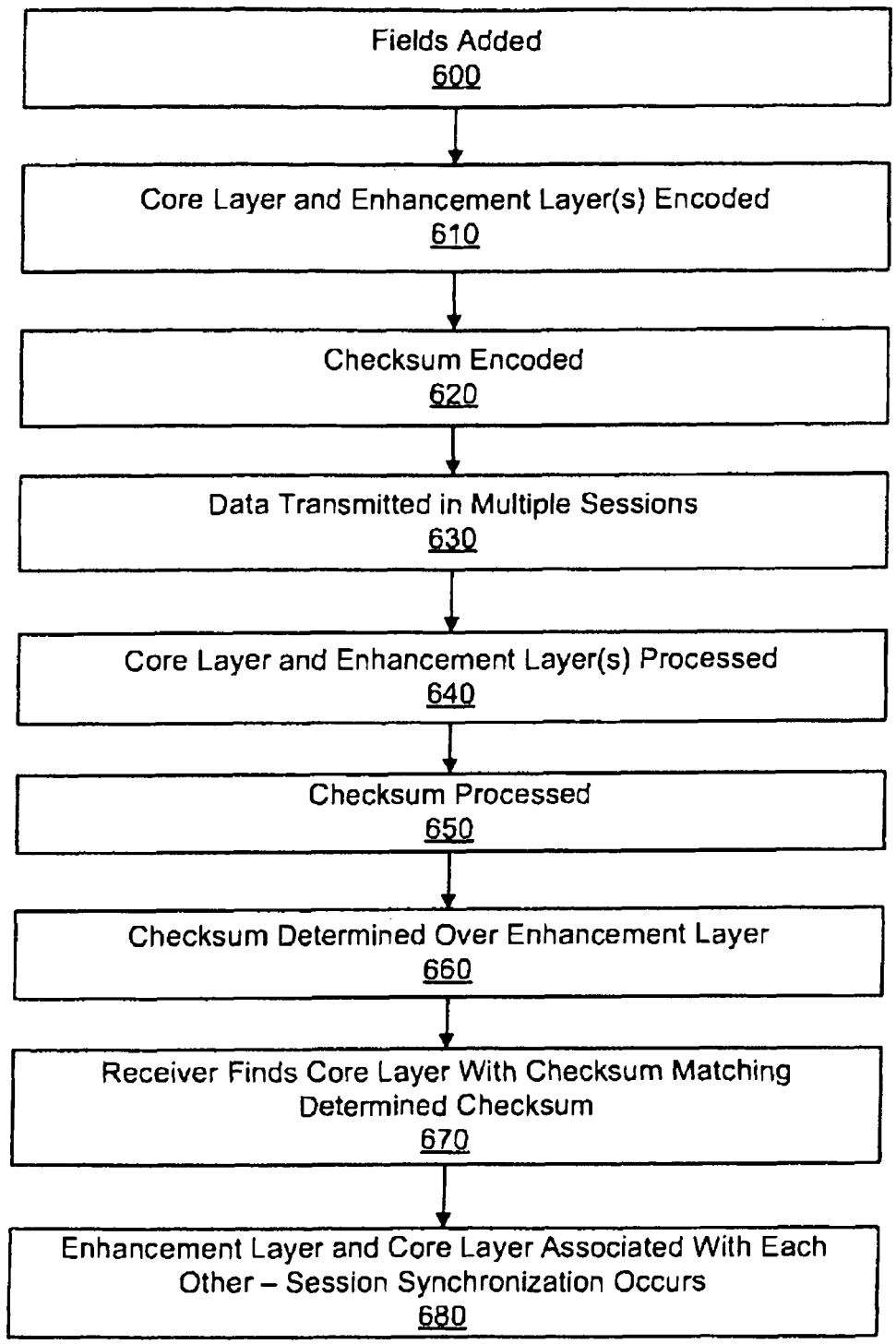
FIG. 6 is a flow chart showing a process by which other various embodiments of the present invention may be implemented.

FIG. 6 is a flow chart showing a process by which various embodiments of the present invention may be implemented. At 610 in FIG. 6, a plurality of layers are encoded, including a core layer and at least one enhancement layer. At 620, a single checksum is encoded. It should be noted that, although 610 and 620 are shown as occurring sequentially, these processes can occur simultaneously and/or as a single process. As discussed previously, the single checksum is applicable for use in performing error checks of the core layer and each corresponding enhancement layer. As discussed previously, this may be accomplished when necessary by adding an additional field (the tail bits fields of FIGS. 4 and 5) to one or more of the enhancement layers such that the single checksum will be matched during any subsequent error check where no errors or missing data are present. The adding of these fields is represented at 600. The transmitted data is formulated in such a way that the CRC checksum computed over an enhancement layer corresponding to a certain core layer is modified to have the same value as the CRC checksum included in the packet carrying the data for the corresponding core layer. At 630, the encoded data is transmitted from a sending apparatus to a receiving apparatus in multiple sessions.

At 640, the core layer and enhancement layers are processed from the bitstream by the receiver, and the single checksum is processed at 650. Again, although these processes are shown as occurring sequentially, these processes can occur simultaneously and/or as a single process. At 660, the CRC checksum is determined over an enhancement layer. At 670, the receiver finds a received core layer with a CRC checksum which matches the CRC checksum determined at 660. When such a matching CRC checksum is found, the enhancement layer and the core layer are associated with each other at 680. At this point, the synchronization between RTP sessions carrying the core layer identified at 670 and the enhancement layer for which the CRC checksum was determined at 660 is established.

Figure 7:
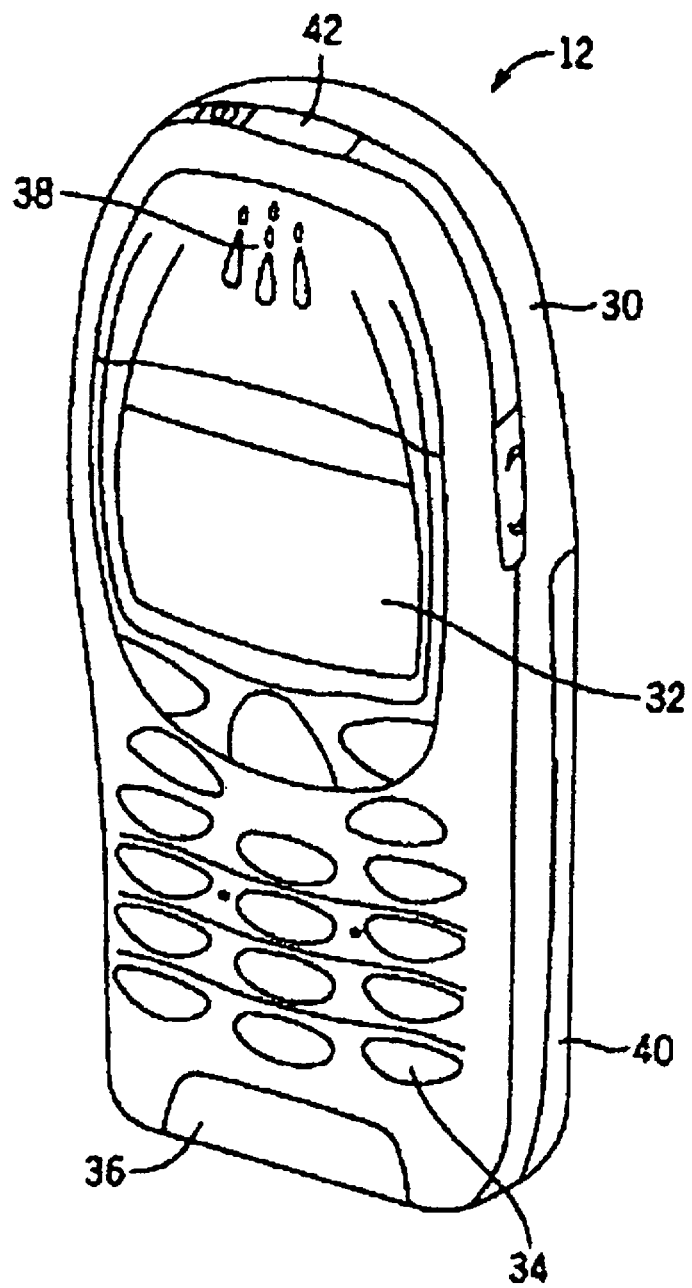
FIG. 7 is a perspective view of an electronic device that can be used in conjunction with the implementation of various embodiments of the present invention.
Figure 8:
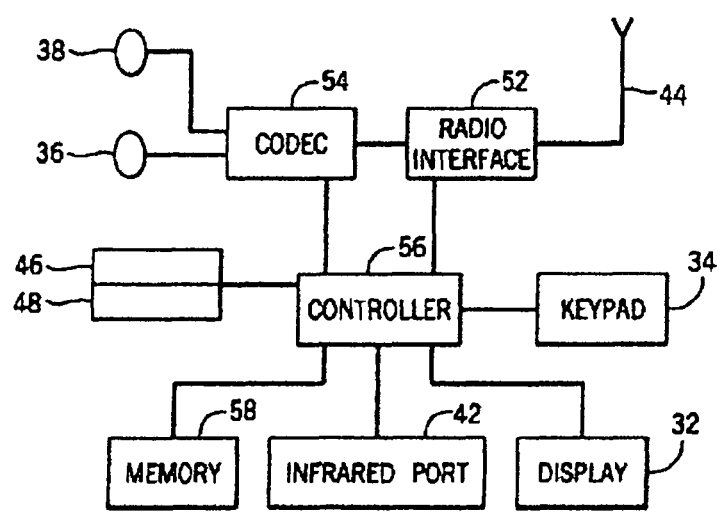
FIG. 8 is a schematic representation of the circuitry which may be included in the electronic device of FIG. 7.

FIGS. 7 and 8 show one representative mobile device 12 within which the present invention may be implemented. It should be understood, however, that the present invention is not intended to be limited to one particular type of electronic device. The mobile device 12 of FIGS. 7 and 8 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for encoding data into a bitstream, comprising:
   encoding a core layer of coded media data and at least one corresponding enhancement layer of coded media data into the bitstream;
   computing a single checksum for the core layer; and
   adding an additional field to each of the at least one enhancement layer such that any subsequent error check involving the respective at least one enhancement layer together with its respective additional field will match the single checksum if no data of the respective at least one enhancement layer or of its respective additional field is missing or in error, the single checksum thus being applicable for use in performing subsequent error checks of the core layer, and of each at least one enhancement layer, either alone or in combination with each lower corresponding enhancement layer and the core layer.

2. The method of claim 1, wherein the single checksum comprises a cyclic redundancy check checksum.

3. The method of claim 1, wherein the single checksum is encoded in a payload header for the encoded core layer and the at least one corresponding enhancement layer.

4. The method of claim 1, wherein the single checksum is encoded in a header of a lower-layer protocol for the encoded core layer and the at least one corresponding enhancement layer.

5. The method of claim 1, wherein the single checksum is encoded in a payload.

6. The method of claim 1, wherein the single checksum is encoded in a packet header.

7. The method of claim 1, wherein the additional field is added at the beginning of each enhancement layer.

8. The method of claim 1, wherein the additional field is added at the end of each enhancement layer.

9. The method of claim 1, wherein the additional field is encoded in a payload.

10. The method of claim 1, wherein the additional field is encoded in a packet header.

11. The method of claim 1, wherein the additional field is encoded in a payload header.

12. The method of claim 1, wherein the core layer and the at least one corresponding enhancement layer are transmitted to a remote device in a plurality of sessions.

13. A computer program product, embodied in a non-transitory computer-readable storage medium, comprising computer code configured to perform the processes of claim 1.

14. An apparatus, comprising:
   an electronic device configured to:
      encode a core layer of coded media data and at least one corresponding enhancement layer of the coded media data into the bitstream;
      compute a single checksum for the core layer; and
      add an additional field to each of the at least one enhancement layer such that any subsequent error check involving the respective at least one enhancement layer together with its respective additional field will match the single checksum if no data of the respective at least one enhancement layer or of its respective additional field is missing or in error, the single checksum thus being applicable for use in performing subsequent error checks of the core layer, and of each at least one enhancement layer, either alone or in combination with each lower corresponding enhancement layer and the core layer.

15. The apparatus of claim 14, wherein the single checksum comprises a cyclic redundancy check checksum.

16. The apparatus of claim 14, wherein the single checksum is encoded in a payload header for the encoded core layer and the at least one corresponding enhancement layer.

17. The apparatus of claim 14, wherein the single checksum is encoded in a header of a lower-layer protocol for the encoded core layer and the at least one corresponding enhancement layer.

18. The apparatus of claim 14, wherein the single checksum is encoded in a payload.

19. The apparatus of claim 14, wherein the single checksum is encoded in a packet header.

20. The apparatus of claim 14, wherein the additional field is added at the beginning of each enhancement layer.

21. The apparatus of claim 14, wherein the additional field is added at the end of each enhancement layer.

22. The apparatus of claim 14, wherein the additional field is encoded in a payload.

23. The apparatus of claim 14, wherein the additional field is encoded in a packet header.

24. The apparatus of claim 14, wherein the additional field is encoded in a payload header.

25. The apparatus of claim 14, wherein the core layer and the at least one corresponding enhancement layer are transmitted to a remote device in a plurality of sessions.

26. A method of processing encoded data from a bitstream, comprising:
   processing a core layer and at least one corresponding enhancement layer together with its respective additional field from the bitstream;
   processing a single checksum from the bitstream; and
   performing a check of one of the at least one corresponding enhancement layer, either alone or in combination with each lower corresponding enhancement layer and the core layer, using the single checksum, wherein the single checksum is usable regardless of the number of corresponding enhancement layers which are used in the check, and wherein an additional field has been previously added to each enhancement layer such that any subsequent check involving the respective enhancement layer together with its respective additional field will match the single checksum if no data of the respective enhancement layer or of its respective additional field is missing or in error.

27. The method of claim 26, wherein the single checksum comprises a cyclic redundancy check checksum.

28. The method of claim 26, wherein the single checksum is located in a payload header for the encoded core layer and the at least one corresponding enhancement layer.

29. The method of claim 26, wherein the single checksum is located in a header of a lower-layer protocol for the encoded core layer and the at least one corresponding enhancement layer.

30. The method of claim 26, wherein the single checksum is encoded in a payload.

31. The method of claim 26, wherein the single checksum is encoded in a packet header.

32. The method of claim 26, wherein the additional field has been added at the beginning of each enhancement layer.

33. The method of claim 26, wherein the additional field has been added at the end of each enhancement layer.

34. The method of claim 26, wherein the additional field is encoded in a payload.

35. The method of claim 26, wherein the additional field is encoded in a packet header.

36. The method of claim 26, wherein the additional field is encoded in a payload header.

37. The method of claim 26, wherein the core layer and the at least one corresponding enhancement layer are received from a remote device in a plurality of sessions, and further comprising:
    using the performed check to match the core layer with the at least one corresponding enhancement layer; and
    synchronizing the plurality of sessions including the core layer and the at least one corresponding enhancement layer.

38. The method of claim 26, wherein checks are performed simultaneously for each corresponding enhancement layer and the core layer, and further comprising using in a subsequent process only those layers which have been correctly received.

39. A computer program product, embodied in a non-transitory computer-readable storage medium, comprising computer code configured to perform the processes of claim 26.

40. An apparatus, comprising:
    an electronic device configured to:
    process a core layer and at least one corresponding enhancement layer together with its respective additional field from the bitstream;
    process a single checksum from the bitstream; and
    perform a check of one of the at least one corresponding enhancement layer, either alone or in combination with each lower corresponding enhancement layer and the core layer, using the single checksum, wherein the single checksum is usable regardless of the number of corresponding enhancement layers which are used in the check, and wherein an additional field has been previously added to each enhancement layer such that the check involving the respective enhancement layer together with its respective additional field will match the single checksum if no data of the respective enhancement layer or of its respective additional field is missing or in error.

41. The apparatus of claim 40, wherein the single checksum comprises a cyclic redundancy check checksum.

42. The apparatus of claim 40, wherein the single checksum is located in a payload header for the encoded core layer and the at least one corresponding enhancement layer.

43. The apparatus of claim 40, wherein the single checksum is located in a header of a lower-layer protocol for the encoded core layer and the at least one corresponding enhancement layer.

44. The apparatus of claim 40, wherein the single checksum is encoded in a payload.

45. The apparatus of claim 40, wherein the single checksum is encoded in a packet header.

46. The apparatus of claim 40, wherein the additional field has been added at the beginning of each enhancement layer.

47. The apparatus of claim 40, wherein the additional field has been added at the end of each enhancement layer.

48. The apparatus of claim 40, wherein the additional field is encoded in a payload.

49. The apparatus of claim 40, wherein the additional field is encoded in a packet header.

50. The apparatus of claim 40, wherein the additional field is encoded in a payload header.

51. The apparatus of claim 40, wherein the core layer and the at least one corresponding enhancement layer are received from a remote device in a plurality of sessions, and wherein the electronic device is further configured to:
    use the performed check to match the core layer with the at least one corresponding enhancement layer; and
    synchronize the plurality of sessions including the core layer and the at least one corresponding enhancement layer.

52. The apparatus of claim 40, wherein checks are performed simultaneously for each corresponding enhancement layer and the core layer, and wherein the electronic device is further configured to use in a subsequent process only those layers which have been correctly received.

* * * * *